Feb. 12, 1952     H. C. G. R. NEDERGAARD     2,585,575
SAFETY VALVE WITH SPRING LOADED DIAPHRAGM
Filed Feb. 27, 1948
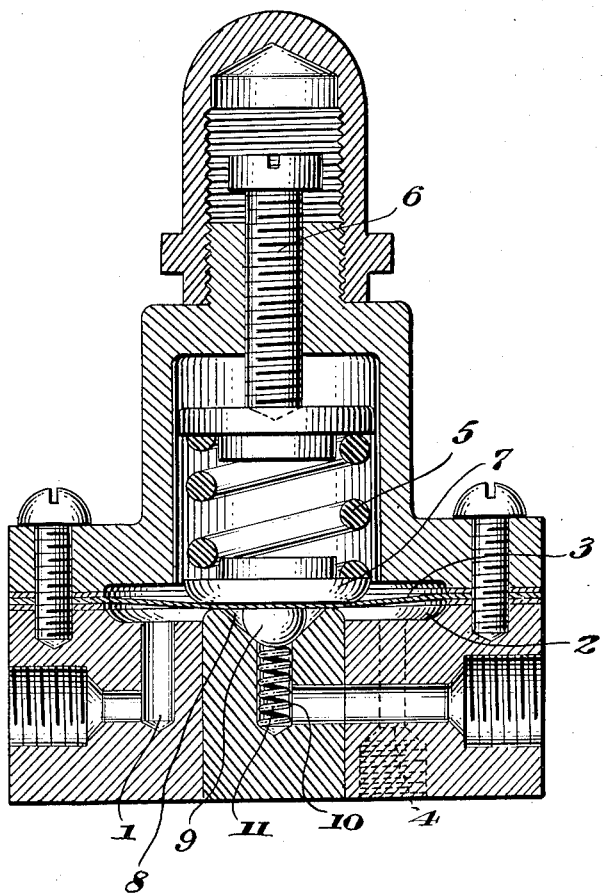
INVENTOR
H.C.G.R. Nedergaard
BY Wenderoth, Lind + Ponack
ATTORNEYS

Patented Feb. 12, 1952

2,585,575

UNITED STATES PATENT OFFICE 2,585,575

SAFETY VALVE WITH SPRING LOADED DIAPHRAGM

Hans Christiern Georg Richard Nedergaard, Holbaek, Denmark

Application February 27, 1948, Serial No. 11,568
In Denmark September 15, 1945

Section 1, Public Law 690, August 8, 1946
Patent expires September 15, 1965

3 Claims. (Cl. 137—53)

In safety valves it is known to use a diaphragm, which is fixed in the valve housing and transmits the adjustable pressure of a load spring to the valve body, which normally keeps a liquid chamber shut off from the overflow channel. However, in such valves there will often be vibrations when the pressure on the delivery side of the valve, by means of a pump, is kept approximately at the pressure at which the safety valve opens, for in that case the valve will open and close in time to the pressure variations produced by the pump strokes, which will cause vibrations, which may knock the diaphragm to pieces fairly quickly, with the result that it will leak, so that the valve will become inoperative and fail in its safety function.

This drawback is remedied in the valve according to the invention, the valve body being a spherical segment, the flat side of which is kept pressed against the diaphragm, and the spherical part of which rests in a bowl-shaped depression, into the bottom of which the overflow channel opens, and against the edge of which the diaphragm rests as a valve seating under the influence of the load spring. Vibrations of the nature mentioned above, where the spherical segment will be caused to beat against the diaphragm, will in the present case be without any detrimental effect, partly, owing to the comparatively low specific pressure, partly, owing to the considerable damping of the striking of the flat side of the segment against the diaphragm.

To avoid seizing-up, in greater or less degree, of the spherical segment at the entrance of the overflow channel, by which seizing-up similar knocking phenomena to those mentioned above may arise, the valve can be made in such a way according to the invention that the bowl-shaped depression at the entrance of the overflow channel has a radius of curvature which is a little bigger than the radius of the spherical segment.

The drawing shows a sectional elevation of an embodiment of a safety valve according to the invention.

Through a channel 1 liquid flows upwards from a pressure vessel under a diaphragm 3, distended in a chamber 2, from where the liquid passes on through one or several discharge passages, which are indicated in the drawing by dotted lines 4. When the pressure in the vessel increases so as to exceed a certain amount, the diaphragm 3 will be raised against the effect of a spiral spring 5, the distortion of which can be adjusted in advance by the turning of a screw 6. The spring 5 presses with rather a wide shoe 7 on the diaphragm 3 in order that the latter may not be damaged.

On the raising of the diaphragm 3 it will admit the liquid to a bowl-shaped depression 8, against the edges of which the diaphragm has, so far, rested as against a valve seating. At the same time a spherical segment 9, placed in the said depression 8, the flat side of which segment is kept constantly pressed against the underside of the diaphragm by means of a spring 10, will be raised from its seat at the bottom of the depression. In this way the liquid will be able to pass from the bottom of the depression into an overflow channel 11, which so far has been covered by the spherical segment 9, and from where the liquid flows to a reservoir or sump containing liquid, which is sucked to the delivery side of the valve in the usual manner.

The spring 10 is a spiral spring, which is placed in the channel 11 in such manner that it is kept slightly compressed by the spherical segment 9, when the latter is lying at the bottom of the depression 8.

As soon as the pressure in the circuit system is reduced anew, the diaphragm 3 is again lowered owing to the influence of the spring 5, overcoming the resistance of the spring 10, whereby the overflow through the channel 11 is brought to a stop.

The valve, shown, is very reliable and sturdy, and the diaphragm 3 is well protected from the arising and effects of any knocking phenomena in consequence of the continual turning on and turning off of the overflow in the valve caused by fluctuations of pressure in the liquid.

I claim:

1. A safety valve comprising a casing, a valve chamber in said casing, liquid inlet and outlet means connected with said chamber, a diaphragm stretched across said chamber, a member in said chamber having a bowl-shaped depression in the upper end thereof and an overflow passage therethrough, a circular shoe in said chamber, adjustable spring means pressing said circular shoe against said diaphragm, said shoe having a plane bottom surface of greater diameter than the upper edge of the bowl-shaped depression, a spherical segment having a flat upper portion in said depression, spring means in said member in contact with said spherical segment constantly urging said flat portion against said diaphragm and adapted to lift said spherical segment upon raising of said diaphragm under high inlet pressure in said valve chamber, said spherical segment being greater in height than the depth of said depression whereby a narrow gap acting as a pressure trap will appear between the diaphragm and the upper edge of the bowl-shaped depression when the segment rests on the bottom of the depression closing the access to the overflow passage and when the flat upper portion of the segment is kept in contact with the diaphragm.

2. A safety valve as claimed in claim 1 said spherical segment being loosely inserted in the said depression below the said diaphragm.

3. A safety valve as claimed in claim 1, said bowl-shaped depression having a radius of curvature slightly larger than the radius of said spherical segment.

HANS CHRISTIERN GEORG RICHARD NEDERGAARD.

REFERENCES CITED

The following references are of record in the file of this patent:

UNITED STATES PATENTS

| Number | Name | Date |
|---|---|---|
| 1,185,596 | Eddy | May 30, 1916 |
| 1,290,030 | Acebal | Jan. 7, 1919 |
| 1,521,081 | Dooling | Dec. 30, 1924 |
| 1,786,402 | Russel | Dec. 23, 1930 |
| 2,318,157 | Heiser | May 4, 1943 |

FOREIGN PATENTS

| Number | Country | Date |
|---|---|---|
| 198,771 | Great Britain | of 1923 |
| 395,923 | France | of 1908 |
| 597,093 | Germany | of 1934 |